United States Patent
Yoneda

(10) Patent No.: US 7,288,979 B2
(45) Date of Patent: Oct. 30, 2007

(54) SEMICONDUCTOR EQUIPMENT

(75) Inventor: Takashi Yoneda, Mishima-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 172 days.

(21) Appl. No.: 11/180,679

(22) Filed: Jul. 14, 2005

(65) Prior Publication Data

US 2006/0017487 A1    Jan. 26, 2006

(30) Foreign Application Priority Data

Jul. 23, 2004   (JP) ............................. 2004-215053

(51) Int. Cl.
*G06F 1/04* (2006.01)
*G06F 1/08* (2006.01)

(52) U.S. Cl. .................... 327/291; 327/298; 327/99

(58) Field of Classification Search .................. None
See application file for complete search history.

(56) References Cited

U.S. PATENT DOCUMENTS

| 5,517,109 | A | * | 5/1996 | Albean et al. ........... 324/158.1 |
| 6,075,389 | A | * | 6/2000 | Umemoto et al. ............. 327/49 |
| 6,737,904 | B1 | * | 5/2004 | Butaud et al. .............. 327/298 |
| 6,927,604 | B2 | * | 8/2005 | Boerstler et al. ............. 326/93 |
| 7,196,554 | B2 | * | 3/2007 | Taskin et al. ................. 327/99 |
| 2003/0159079 | A1 | | 8/2003 | Harima |

* cited by examiner

*Primary Examiner*—Tuan T Lam
(74) *Attorney, Agent, or Firm*—Steptoe & Johnson

(57) ABSTRACT

There is provided a semiconductor integrated circuit in which a source clock (S101) is inputted to a delay circuit (3), a counter circuit (6) is operated in response to a delay clock (S102) which is the output of the delay circuit (3), a clock used as a system clock by an internal circuit (4) is selected from the source clock (S101) and the delay clock (S102) based on the value of the counter circuit (6), and the duty cycle of the system clock is changed, so that it is possible to reduce electromagnetic interference resulting from harmonics generated by the switching of the internal circuit.

2 Claims, 9 Drawing Sheets

SEMICONDUCTOR EQUIPMENT

FIELD OF THE INVENTION

The present invention relates to semiconductor equipment comprising an internal circuit operating in synchronization with a system clock signal.

BACKGROUND OF THE INVENTION

In an internal circuit of conventional semiconductor equipment, internal elements repeat high-speed switching in synchronization with a signal called a system clock. As a result, harmonic current passes through the internal circuit and flows to the outside, resulting in electromagnetic interference and so on (Japanese Patent Laid-Open No. 5-152908).

FIG. 10 shows such conventional semiconductor equipment.

A semiconductor chip 101 serving as semiconductor equipment comprises an oscillator circuit 2 to which an oscillator or a radiator is connected and an internal circuit 4 which operates in synchronization with a system clock S191 outputted from the oscillator circuit 2. FIG. 11 shows the system clock S191 and the current waveform of the internal circuit 4 of the semiconductor equipment shown in FIG. 10.

To be specific, circuit elements constituting the internal circuit 4 start signal changes simultaneously at the rising edge of the system clock S191 having been generated in the oscillator circuit 2. In a CMOS circuit constituting the internal circuit 4, through current and charge/discharge current required for a voltage change of a signal line are generated during the transition of a signal, and the current is consumed at the rising edge of the system clock. FIG. 12 shows the existing state of the generation of high-order harmonics. The first spectrum indicates the second-order harmonics of the system clock, and the subsequent spectrum indicates fourth-order harmonics.

Under present circumstances, in semiconductor equipment where internal elements repeat high-speed switching in synchronization of a system clock, high-order harmonics are generated and result in electromagnetic interference.

It is an object of the present invention to provide semiconductor equipment which hardly causes electromagnetic interference.

DISCLOSURE OF THE INVENTION

In the present invention, a source clock is inputted to a delay circuit, a counter circuit is operated in response to a delay clock which is the output of the delay circuit, and a clock used as a system clock is selected from the source clock and the delay clock based on the value of the counter circuit. With this configuration, it is possible to easily change the duty cycle of the system clock, thereby achieving semiconductor equipment hardly causing electromagnetic interference.

Semiconductor equipment according to the first aspect of the present invention comprises an oscillator circuit which is connected to an oscillator or a radiator and outputs a source clock, an internal circuit operating in synchronization with a system clock, a delay circuit for generating a delay clock delayed by a specified time from the source clock outputted from the oscillator circuit, a counter circuit for counting the delay clock, and a selector circuit which selects the source clock and the delay clock based on the value of the counter circuit and outputs the system clock to the internal circuit. With this configuration, the clock is selected in response to a selection signal controlled by the delay clock, so that it is possible to obtain semiconductor equipment which can simplify timing control, can readily change the duty cycle of the system clock, and hardly causes electromagnetic interference.

According to the second aspect of the present invention, the semiconductor equipment according to the first aspect is characterized in that only the least significant bit has an initial value of "1" and other bits have initial values of "0" in the counter circuit. With this configuration, the counter circuit can be shared with a timer circuit in the semiconductor equipment. It is possible to obtain semiconductor equipment which hardly causes electromagnetic interference while further suppressing an increase in circuit size.

Semiconductor equipment according to the third aspect of the present invention comprises an oscillator circuit which is connected to an oscillator or a radiator and outputs a source clock, an internal circuit operating in synchronization with a system clock, a first delay circuit for generating a first delay clock delayed by a specified time from the source clock outputted from the oscillator circuit, a second delay circuit for generating a second delay clock delayed more than the first delay clock from the source clock outputted from the oscillator circuit, a delay clock selector circuit which selects the first delay clock or the second delay clock and outputs the selected clock as a delay clock, a counter circuit for counting the output clock of the delay clock selector circuit, and a selector circuit for selecting the source clock or the delay clock based on the value of the counter circuit and outputs the system clock to the internal circuit.

Semiconductor equipment according to the fourth aspect of the present invention comprises an oscillator circuit which is connected to an oscillator or a radiator and outputs a source clock, an internal circuit operating in synchronization with a system clock, a first delay circuit for generating a first delay clock delayed by a specified time from the source clock outputted from the oscillator circuit, a second delay circuit for generating a second delay clock delayed from the first delay clock by the specified time, a delay clock selector circuit which selects and outputs the first delay clock or the second delay clock, a counter circuit for counting the second delay clock, and a selector circuit for selecting the source clock and the output clock of the delay clock selector circuit based on the value of the counter circuit and outputs the system clock to the internal circuit. With this configuration, by switching delay values, harmonic noise in a specific frequency band can be reduced, thereby obtaining semiconductor equipment hardly causing electromagnetic interference.

A compiler according to the fifth aspect of the present invention comprises a phase for inputting a frequency to be avoided in harmonic noise generated from semiconductor equipment, a phase for calculating the optimum delay value based on the frequency, and a phase for determining a value of a delay clock outputted from the selector circuit of claim 3 or 4 based on the calculated delay value. With this configuration, it is possible to automatically set a proper delay value according to a frequency band avoided by a customer, thereby achieving semiconductor equipment hardly causing electromagnetic interference.

As described above, the present invention makes it possible to easily achieve a semiconductor equipment which hardly causes electromagnetic interference with a simple circuit configuration.

DESCRIPTION OF THE EMBODIMENTS

Referring to FIGS. 1 to 9, the following will describe embodiments of the present invention.

EMBODIMENT 1

FIGS. 1 to 4 show (Embodiment 1) of the present invention.

Figure 1:
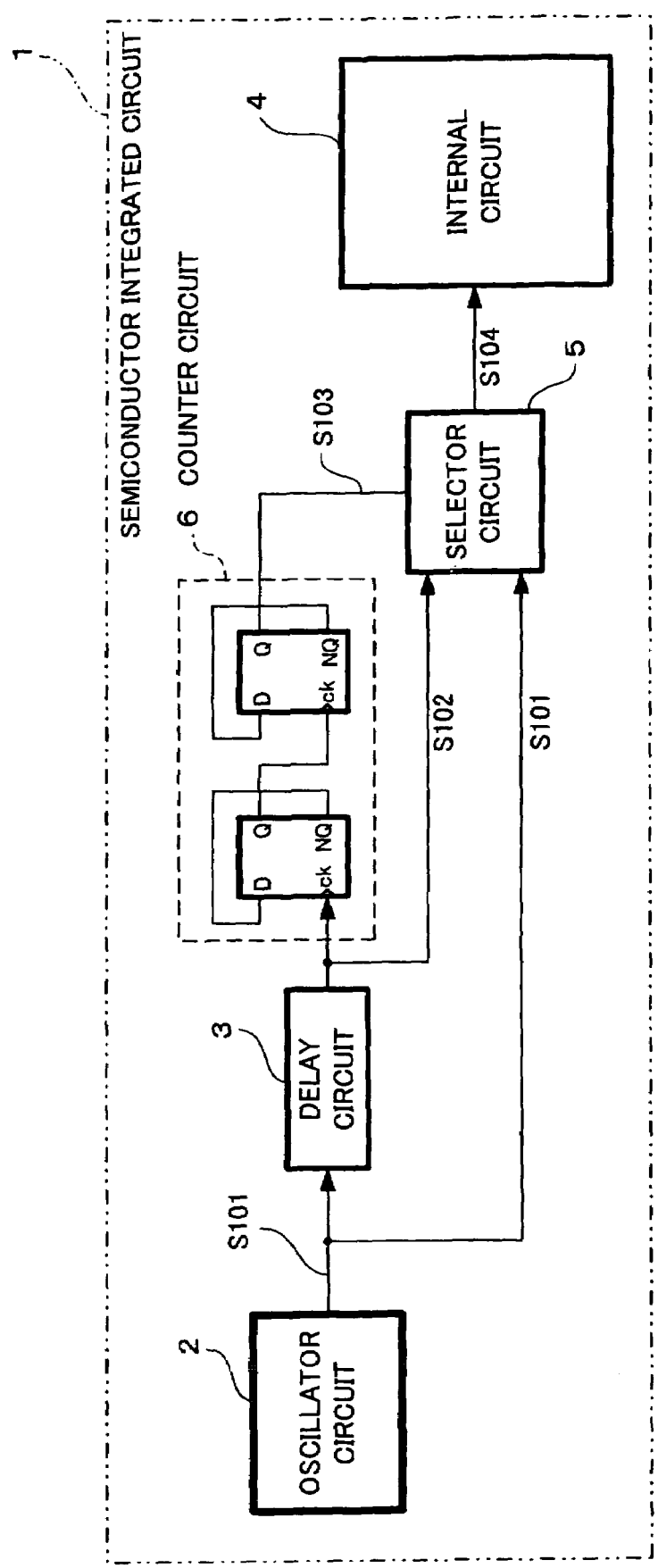
FIG. 1 is a structural diagram showing semiconductor equipment according to (Embodiment 1) of the present invention.
Figure 2:
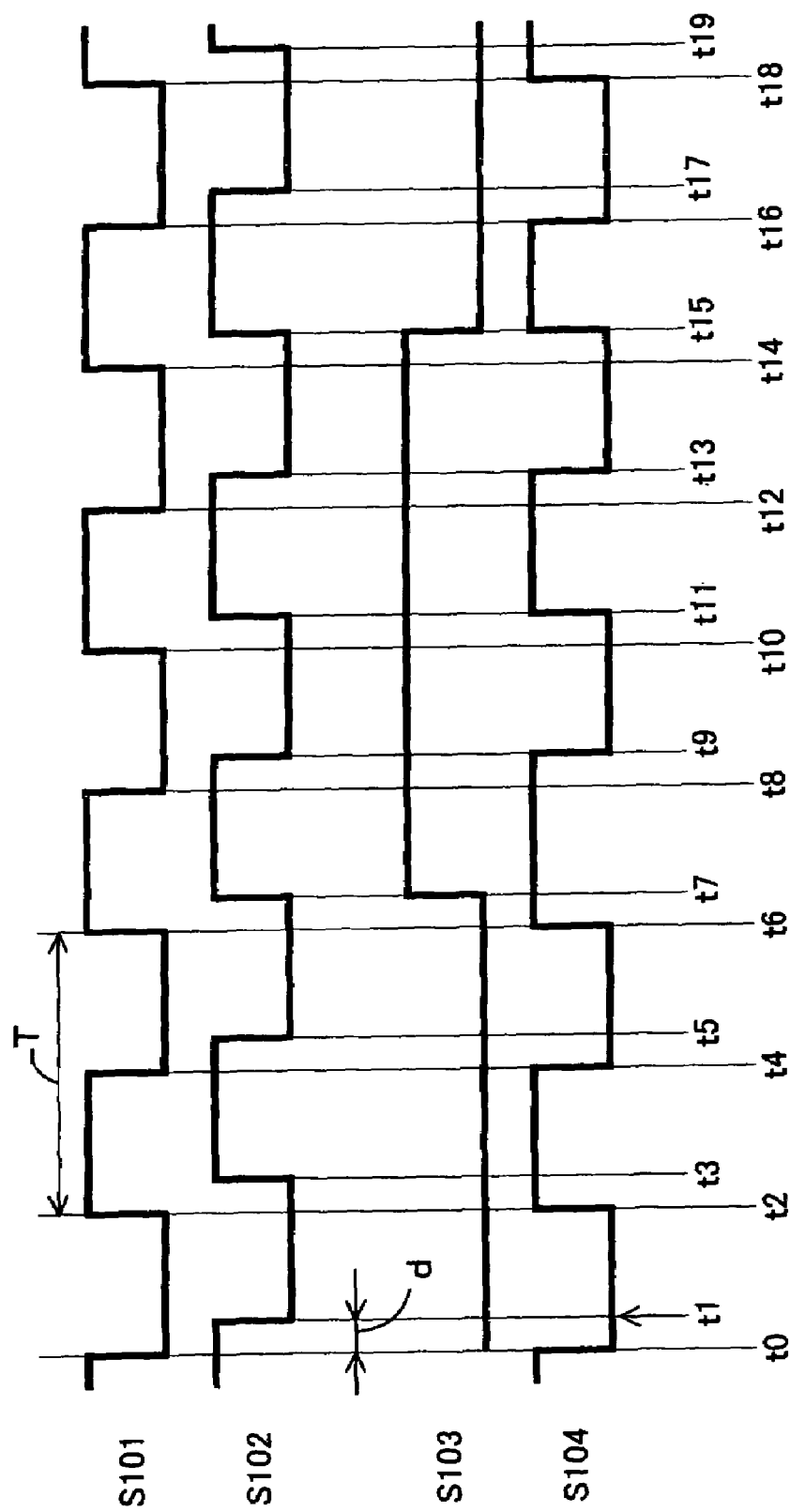
FIG. 2 is a signal waveform diagram of (Embodiment 1)
Figure 3:
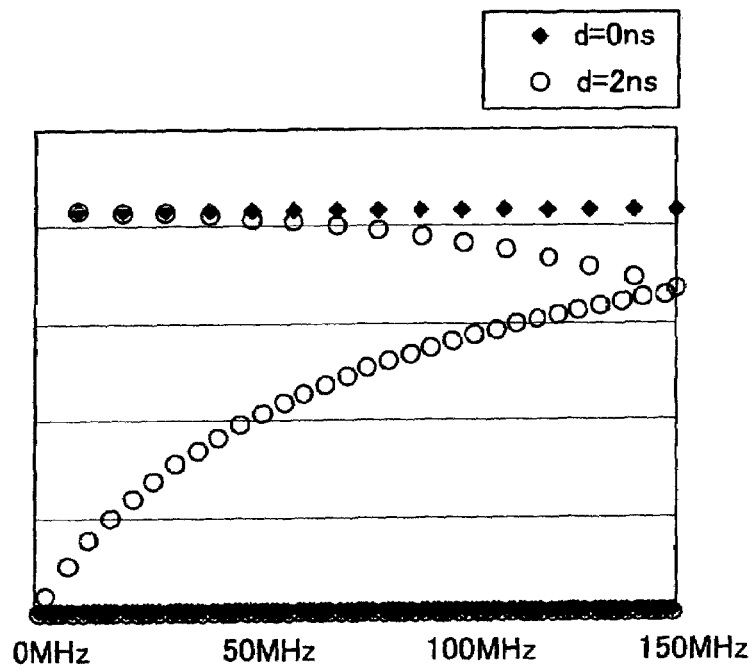
FIG. 3 is a current spectrum waveform chart of (Embodiment 1)
Figure 4:
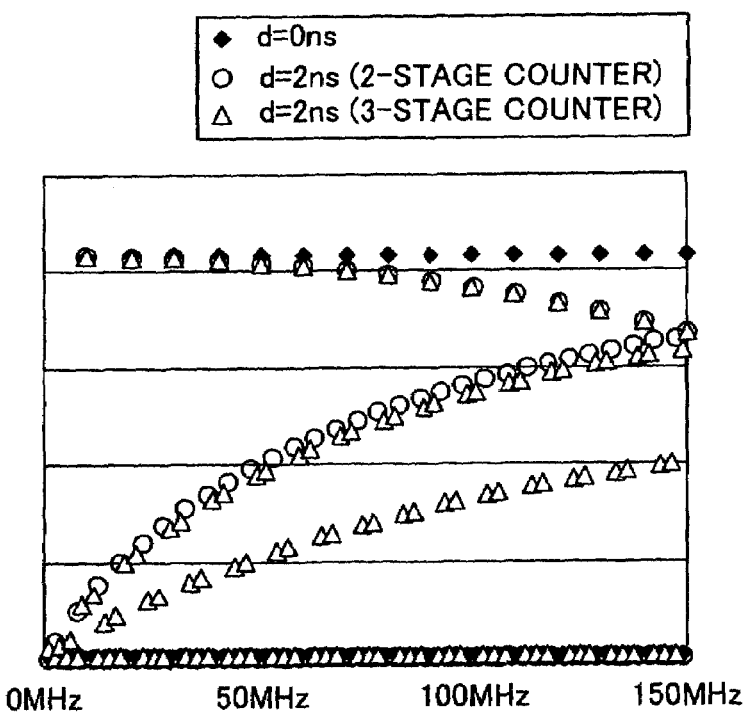
FIG. 4 is a current spectrum waveform chart of (Embodiment 1)

FIG. 1 shows semiconductor equipment of the present invention. FIG. 2 is a signal waveform chart of the semiconductor equipment. FIGS. 3 and 4 are current spectrum diagrams.

In semiconductor equipment 1 having an internal circuit 4 operating in synchronization with a system clock, a logic circuit constituted of a delay circuit 3, a counter circuit 6, and a selector circuit 5 is interposed between the clock input of the internal circuit 4 and an oscillator circuit 2 which is connected to an oscillator or a radiator and outputs a source clock S101. The source clock S101 has a frequency of $f^0$ and a period of T.

The delay circuit 3 outputs a delay clock S102 which is obtained by delaying the source clock S101 from the oscillator circuit 2 by a specified time d.

The counter circuit 6 is a 2-stage counter circuit for counting the delay clock S102 outputted from the delay circuit 3. As shown in FIG. 2, an output signal S103 of the counter circuit 6 is obtained by frequency-dividing the delay clock S102 into four and repeats "H" and "L" every two clocks of the delay clock S102.

The selector circuit 5 is a circuit for controlling a switching operation in response to the output signal S103 of the counter circuit 6. When the output signal S103 is "L", the selector circuit 5 selects the source clock S101 and outputs the clock as a system clock S104. When the output signal S103 is "H", the selector circuit 5 selects the delay clock S102 and outputs the clock as the system clock S104. The system clock S104 is supplied to the clock input of the internal circuit 4.

The semiconductor equipment operates as follows:

First, the following will discuss a state in which the output signal S103 of the counter circuit 6 is "L" (t1).

As shown in FIG. 2, since the output signal S103 is "L" at time t1, the selector circuit 5 selects the source clock S101 and outputs the clock as the system clock S104.

Thus, the system clock changes to "H" at time t2.

Then, the counter circuit 6 makes a count at time t3 which is delayed from time t2 by the specified time d. The output signal S103 is kept at "L". Thus, the selector circuit 5 selects the source clock S101 and outputs the clock as the system clock S104. Hence, the system clock changes to "L" at time t4 and changes to "H" at time t6.

Thereafter, the counter circuit 6 makes another count at time t7 which is delayed from time t6 by the specified time d. The output signal S103 changes to "H". Thus, the selector circuit 5 selects the delay clock S102 and outputs the clock as the system clock S104. Hence, at time t7, the system clock S104 is kept at "H" but does not change at time t8 and time t10. The system clock S104 changes to "L" at time t9 and changes to "H" at time t11.

The counter circuit 6 simultaneously makes another count at time t11 and the output signal S103 is kept at "H". Thus, the selector circuit 5 selects the delay clock S102 and outputs the clock as the system clock S104. Hence, the system clock changes to "L" at time t13 and changes to "H" at time t15.

The counter circuit 6 simultaneously makes another count at time t15 and the output changes to "L". Thus, the selector circuit 5 selects the source clock S101 and outputs the clock as the system clock S104. Hence, at time t15, the system clock S104 is kept at "H", changes to "L" at time t16, and changes to "H" at time t18 which is the same state as time t2.

In this case, the system clock S104 rises at times t2, t6, t11, t15, and t18. The transition period of the system clock S104 changes to T, (T+d), T, and (T−d).

Harmonics have a fundamental period of 4T according to the change of the system clock S104 and a base frequency of $f_0/4$. Since the transition period includes (T+d) and (T−d), n-th components ($nf_0 = 4n \cdot f_0/4$) included in harmonics of $f_0$ are offset and thus the harmonics are reduced.

Figure 10:
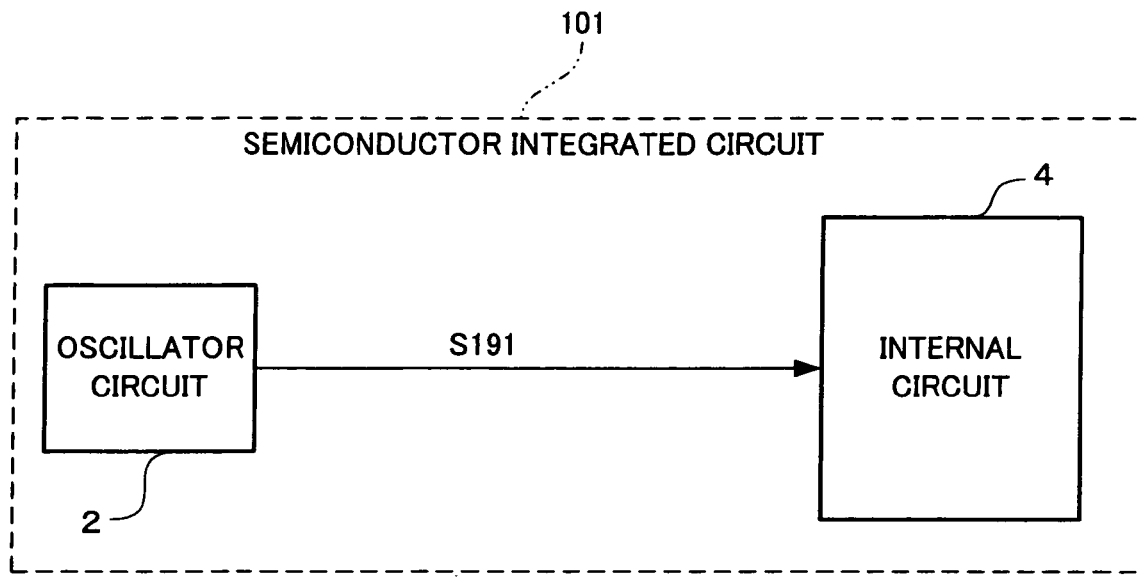
FIG. 10 is a diagram showing the configuration of conventional semiconductor equipment.
Figure 11:
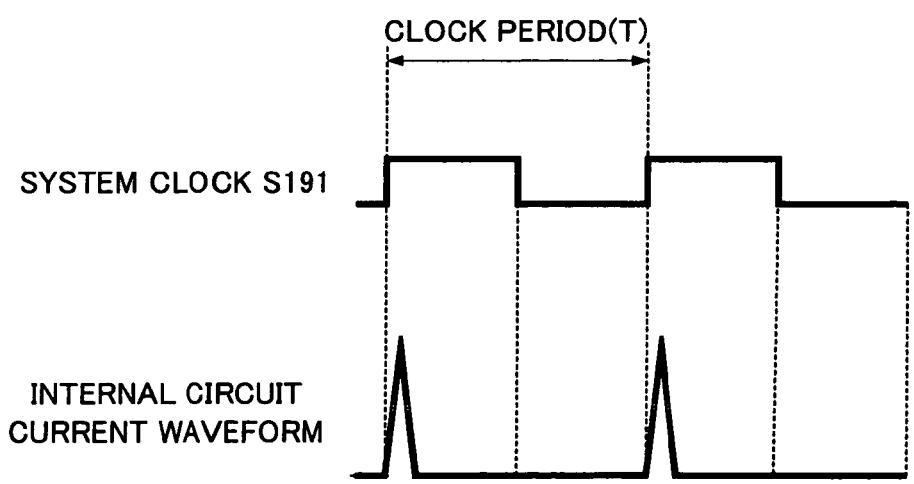
FIG. 11 is a current waveform chart of the conventional semiconductor equipment.
Figure 12:
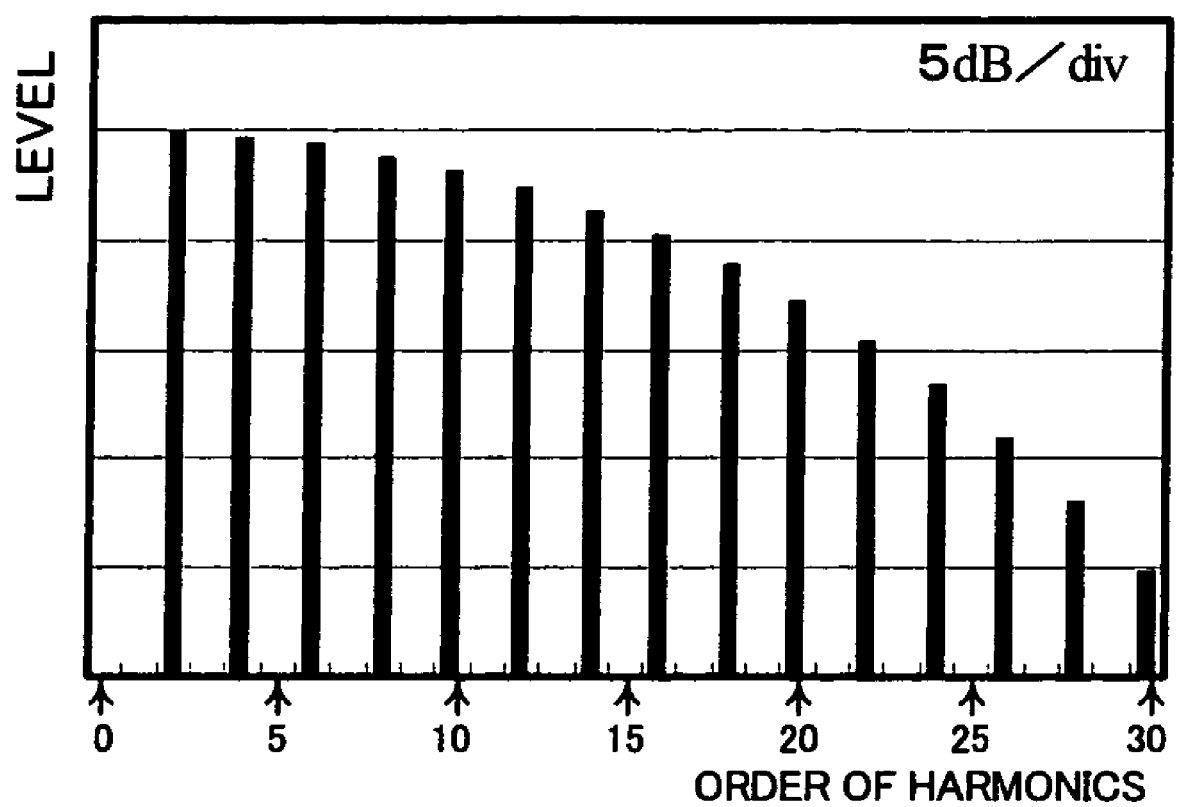
FIG. 12 is a current spectrum waveform chart of the conventional semiconductor equipment.

FIG. 3 shows a comparison between the harmonic level of n-th harmonic components of the conventional example shown in FIG. 10 and the harmonic level of harmonic components of (Embodiment 1). FIG. 3 shows two cases where the specified time d is 2 ns (black squares) and the specified time d is 0 ns (white circles). The frequency $f_0$ of the source clock S101 is 10 MHz (T=100 ns).

When the specified time d is 2 ns in (Embodiment 1), it is possible to achieve semiconductor equipment which can reduce the harmonic components of current I and hardly causes electromagnetic interference.

In FIG. 1, the counter circuit 6 is a 2-stage counter. It is expected that the harmonic components can be further reduced as shown in FIG. 4 by increasing the number of stages of the counter. FIG. 4 shows three cases where the specified time d is 0 ns (black squares), the specified time d is 2 ns in a 2-stage counter (white circles), and the specified time d is 2 ns in a 3-stage counter (white triangles). The frequency $f_0$ of the source clock S101 is 10 MHz (T=100 ns).

EMBODIMENT 2

Figure 5:
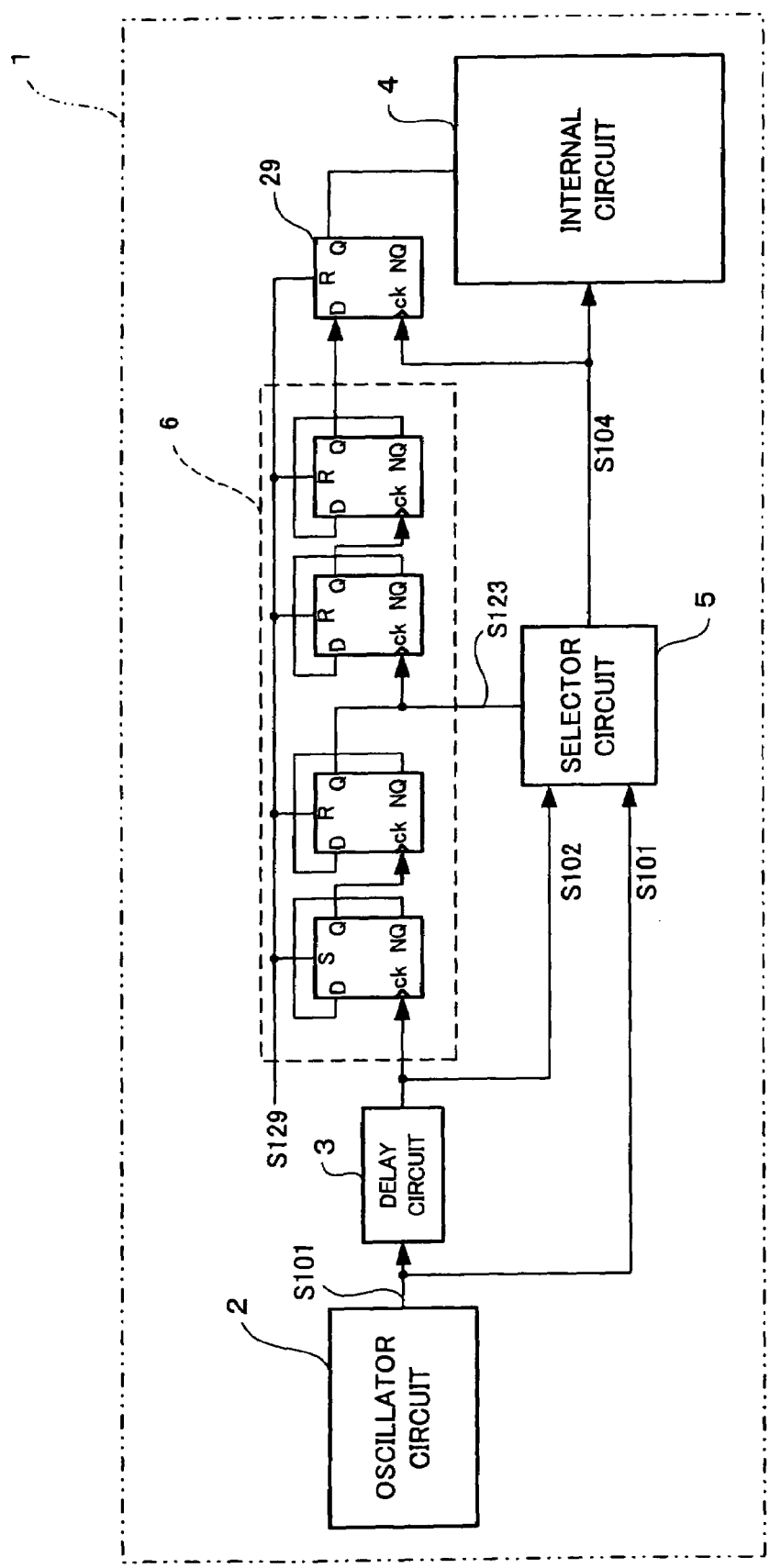
FIG. 5 is a structural diagram showing semiconductor equipment according to (Embodiment 2) of the present invention.

FIG. 5 shows (Embodiment 2) of the present invention.

FIG. 5 shows another example of the counter circuit 6 shown in FIG. 1. An oscillator circuit 2, a delay circuit 3, a selector circuit 5, and an internal circuit 4 of semiconductor equipment of (Embodiment 2) are similar to those of (Embodiment 1).

In FIG. 5, a counter circuit 6 is characterized in that only the least significant bit has an initial value of "1" and other bits have initial values of "0" in response to an initializing signal S129.

A flip-flop 29 is fed with an overflow signal outputted from the counter circuit 6 and uses a system clock S104 as a clock.

The following will discuss the operations of the semiconductor equipment configured thus according to (Embodiment 2).

A source clock S101 with a frequency of $f_0$ and a period T generates a delay clock S102 delayed by a specified time by the delay circuit 3. In response to an output signal S123 of the counter circuit 6, the selector circuit 5 outputs the source clock S101 or the delay clock S102 to the internal circuit 4 as a system clock S104.

The counter circuit 6 counts the delay clock S102. The following will first describe the case where the counter circuit 6 counts (2n−2) clocks.

The initial value of the counter circuit 6 is "1", and then (2n−2) delay clocks are counted. Thus, the internal register of the counter circuit has (2n−2).

In response to the delay clock S102, the counter circuit 6 makes another count, the internal counter has a value of 2n, and an overflow signal is generated. Subsequently, the overflow signal is outputted from the flip-flop 29 by the operation of the system clock S104.

With this configuration, the counter circuit can be shared with a timer circuit in the semiconductor equipment and an adding circuit can be eliminated. Further, the output of a timer counter is operated by the flip-flop 29 in synchronization with the system clock, so that the system clocks can be accurately counted without interfering with the original operation of the timer circuit.

Therefore, it is possible to obtain semiconductor equipment which further suppresses an increase in circuit size and hardly causes electromagnetic interference.

EMBODIMENT 3

Figure 6:
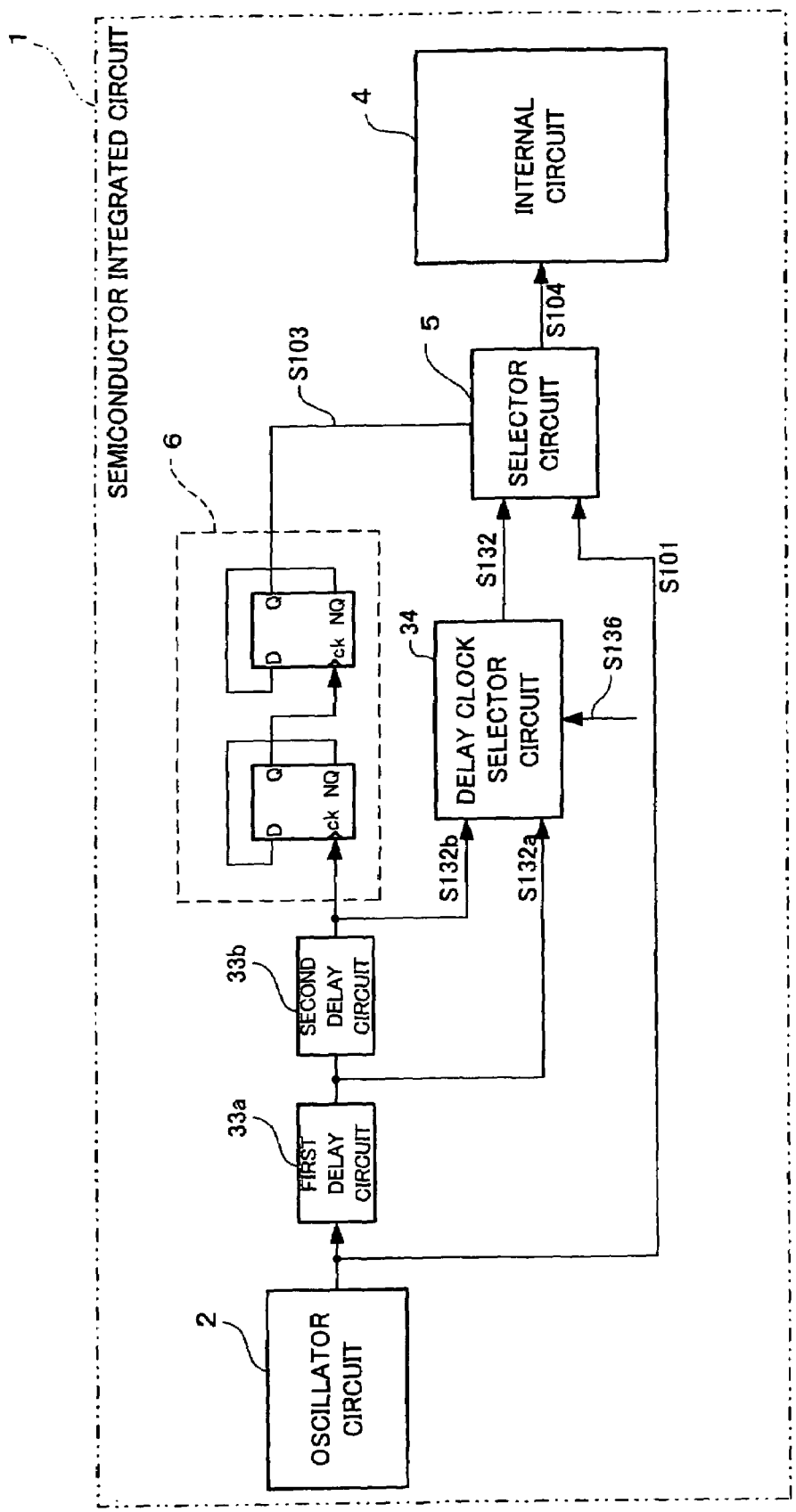
FIG. 6 is a structural diagram showing semiconductor equipment according to (Embodiment 3) of the present invention.
Figure 7:
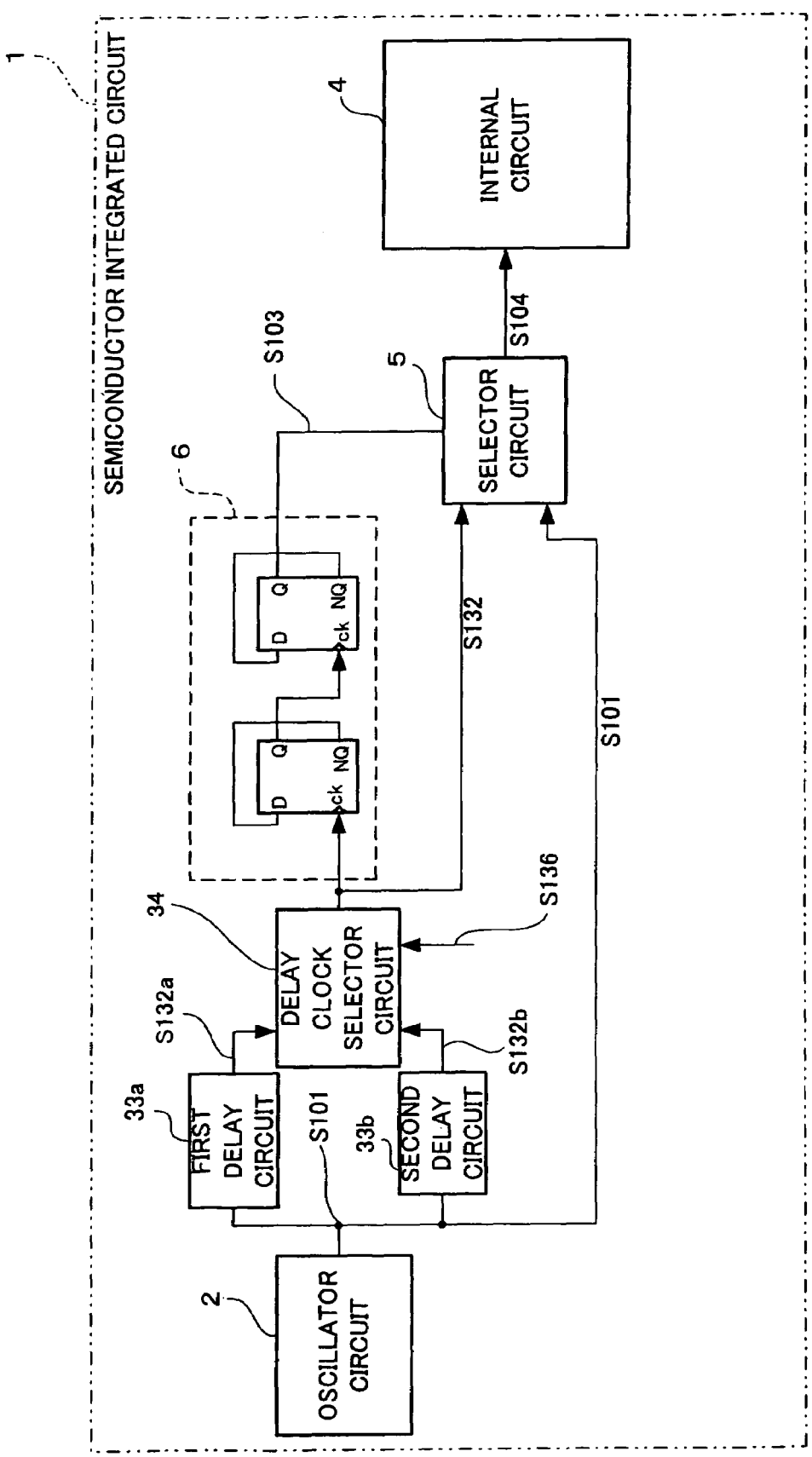
FIG. 7 is another structural diagram of (Embodiment 3)
Figure 8:
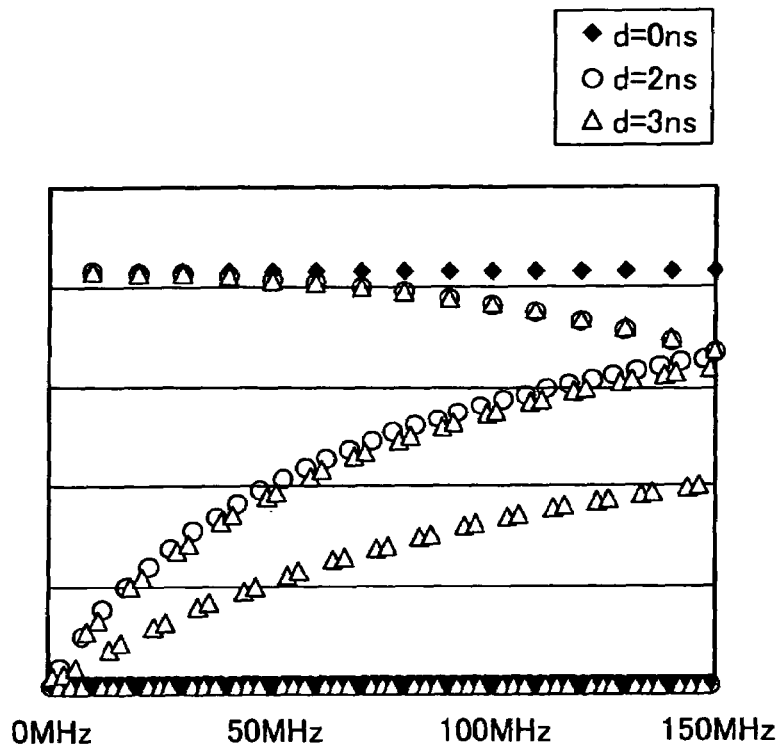
FIG. 8 is a current spectrum waveform chart of (Embodiment 3)

FIGS. 6 and 8 show (Embodiment 3) of the present invention.

FIG. 6 shows another example of the delay circuit 3 shown in FIG. 1. An oscillator circuit 2, a counter circuit 6, a selector circuit 5, and an internal circuit 4 of semiconductor equipment of (Embodiment 3) are similar to those of (Embodiment 1). FIG. 8 is a signal waveform diagram.

Reference numerals 33a and 33b denote first and second delay circuits. A source clock S101 is inputted to the first delay circuit 33a where a delay value is a specified time d1. A delay clock S132a generated on the output of the first delay circuit 33a is outputted as a delay clock S132b through the second delay circuit 33b where a delay value is a specified time d2.

Reference numeral 34 denotes a delay clock selector circuit. The delay clocks S132a and S132b are inputted to the input of the delay clock selector circuit 34. One of the delay clocks S132a and S132b is selected in response to a selection signal S136 and is outputted as a delay clock S132.

The counter circuit 6 counts the delay clock S132b and outputs an output signal S103. The selector circuit 5 outputs one of the delay clock S132 and the source clock S101 as a system clock S104 in response to the output signal S103.

The operations of the semiconductor equipment of (Embodiment 3) will be discussed below.

The following will first discuss the case where the delay clock S132a is selected in response to the selection signal S136.

The delay clock S132a is obtained by delaying the source clock S101 by the specified time d1 in the first delay circuit 33a. In this case, the delay clock S132a is outputted as the delay clock S132.

The source clock S101 and the delay clock S132a are inputted to the selector circuit 5. Harmonics have a fundamental period of 4T according to the change of the system clock S104. The transition period of the system clock S104 changes to T, T+d1, T, and T−d1.

Assuming that the internal circuit 4 operates only at the rising edge of the system clock and a circuit size at each rising edge is equal, a current $I_0(t)$ at each time is determined by Equation 1 below and a current $I(t)$ consumed over the semiconductor equipment is determined by Equation 2:

$$I_0(t) = \Sigma An \cdot \sin(2n\pi \cdot t/4T) \qquad \text{Equation 1}$$

$$\begin{aligned}
I(t) &= I_0(t) + I_0(t+T) + I_0(t+2T+d1) + I_0(t+3T+d1) \qquad \text{Equation 2} \\
&= \Sigma An\{\sin(2n\pi \cdot t/4T) + \sin(2n\pi \cdot (t+T)/4T) + \\
&\quad \sin(2n\pi \cdot (t+2T+d1)/4T) + \sin(2n\pi \cdot \\
&\quad (t+3T+d1)/4T)\} \\
&= \Sigma An[\{\sin(0) + \sin(2n\pi/4) + \sin(2n\pi \cdot \\
&\quad (2T+d1)/4T) + \sin(2n\pi \cdot (3T+d1)/4T)\} \\
&\quad \cos(2n\pi \cdot t/4T) + \{\cos(0) + \cos(2n\pi/4) + \\
&\quad \cos(2n\pi \cdot (2T+d1)/4T) + \cos(2n\pi \cdot (3T+d1)/4T)\} \\
&\quad \sin(2n\pi \cdot t/4T)] \\
&= \Sigma An \sqrt{[\{\sin(0) + \sin(2n\pi/4) + \sin(2n\pi \cdot (2T+d1)/4T) + } \\
&\quad \sin(2n\pi \cdot (3T+d1)/4T)\}^2 + \{\cos(0) + \cos(2n\pi/4) + \\
&\quad \cos(2n\pi \cdot (2T+d1)/4T) + \cos(2n\pi \cdot (3T+d1)/4T)\}^2] \cdot \\
&\quad \sin(2n\pi \cdot t/4T + \theta)
\end{aligned}$$

FIG. 8 shows changes of high frequency spectrum when the specified delay time d1 is changed using Equation 2. FIG. 8 shows three cases where the specified time d is 0 ns (black squares), the specified time d is 2 ns (white circles), and the specified time d is 3 ns (white triangles). The frequency $f_0$ of the source clock S101 is 10 MHz (T=100 ns).

As described above, in the semiconductor equipment according to (Embodiment 3) of the present invention, two or more delay values are prepared for the delay circuits, a different effect of reducing high-frequency waves can be selected for each of the delay values, high-frequency noise can be reduced in a specific frequency band, and electromagnetic interference hardly occurs.

In FIG. 6, in order to obtain the delay clock S132a delayed from the source clock S101 by the specified time d1 and the delay clock S132b delayed from the source clock S101 by a specified time (d1+d2), the first and second delay circuits 33a and 33b are connected in series. The delay clocks can be obtained also by the configuration of FIG. 7, in which the source clock S101 is inputted to the input of the first delay circuit 33a having the specified time d1 and the input of the second delay circuit 33b having the specified time of (d1+d2). In this case, the delay clock selector circuit 34 selects and outputs the delay clock from the output of one of the first and second delay circuits 33a and 33b in response to the selection signal S136. The selector circuit 5 selects and outputs one of the source clock S101 and the clock generated on the output of the delay clock selector circuit 34 in response to the output signal S103 of the counter circuit 6. The counter circuit 6 counts clocks generated on the output of the delay clock selector circuit 34.

EMBODIMENT 4

The present embodiment will describe a compiler capable of determining the optimum delay value in semiconductor equipment of (Embodiment 3).

The compiler has a phase for inputting a frequency to be avoided in high-frequency noise generated from the semiconductor equipment, a phase for calculating the optimum delay value based on the frequency, and a phase for determining a selection signal S136 to a delay clock selector circuit 34 of the semiconductor equipment based on the calculated delay value.

Figure 9:
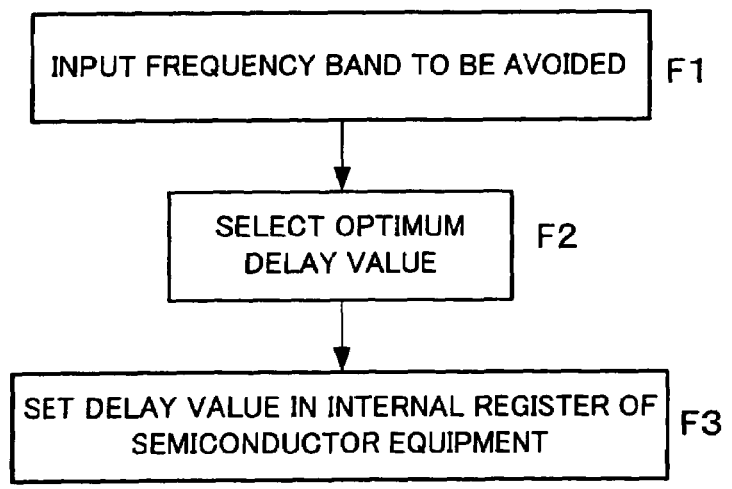
FIG. 9 is a flowchart showing a compiler according to (Embodiment 4) of the present invention.

To be specific, as shown in FIG. 9, a frequency to be avoided in high-frequency noise generated from the semiconductor equipment is inputted on an initialization information entry screen before compilation (phase F1).

Thereafter, the optimum delay value is calculated using Equation 2 (phase F2).

Finally, along with the compilation result, the calculated delay value is set in a register which is disposed in semiconductor equipment 1 and determines the delay values of the first and second delay circuits 33*a* and 33*b* (phase F3).

With this configuration, it is possible to automatically set a proper delay value according to a frequency band avoided by a customer, thereby achieving semiconductor equipment hardly causing electromagnetic interference.

The present invention is applicable to various kinds of semiconductor equipment comprising an internal circuit operating in synchronization with a system clock signal.

What is claimed is:

1. Semiconductor equipment, comprising:
    an oscillator circuit connected to an oscillator or a radiator and outputting a source clock,
    an internal circuit operating in synchronization with a system clock,
    a delay circuit for generating a delay clock delayed by a specified time from the source clock outputted from the oscillator circuit,
    a counter circuit for counting the delay clock, and
    a selector circuit for selecting the source clock and the delay clock based on a value of the counter circuit and outputting the system clock to the internal circuit.

2. The semiconductor equipment according to claim 1, wherein only a least significant bit has an initial value of "1" and other bits have initial values of "0" in the counter circuit.

* * * * *